Aug. 2, 1955  A. P. SHEPARD  2,714,244
METHOD FOR THE PRODUCTION OF SPRAY TUBE
ORIFICES FOR IRRIGATING DEVICES
Original Filed Oct. 11, 1951  2 Sheets-Sheet 1
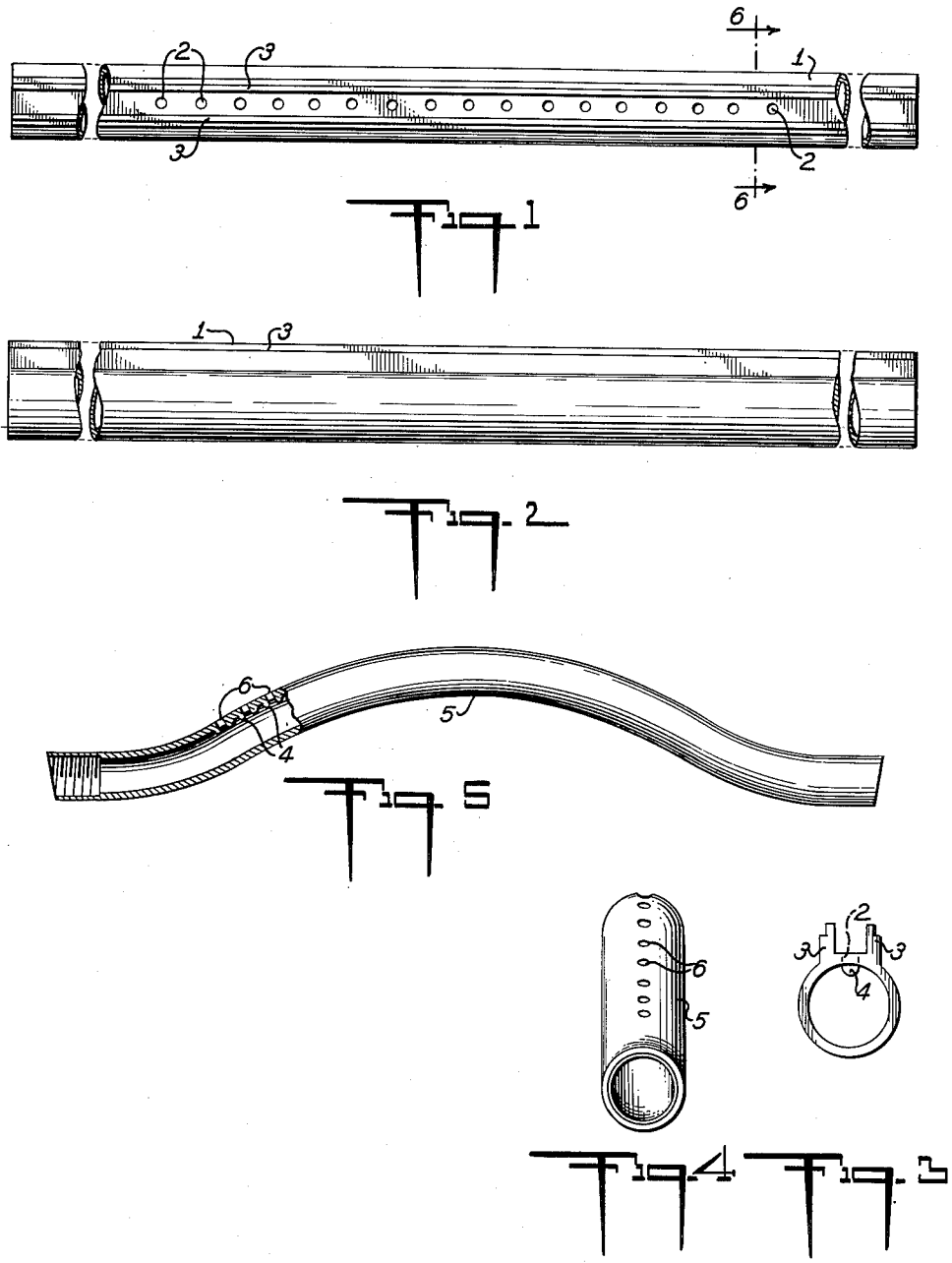
INVENTOR
ARTHUR P. SHEPARD
BY Burgess & Dinklage
ATTORNEYS Aug. 2, 1955     A. P. SHEPARD     2,714,244
METHOD FOR THE PRODUCTION OF SPRAY TUBE
ORIFICES FOR IRRIGATING DEVICES
Original Filed Oct. 11, 1951     2 Sheets-Sheet 2
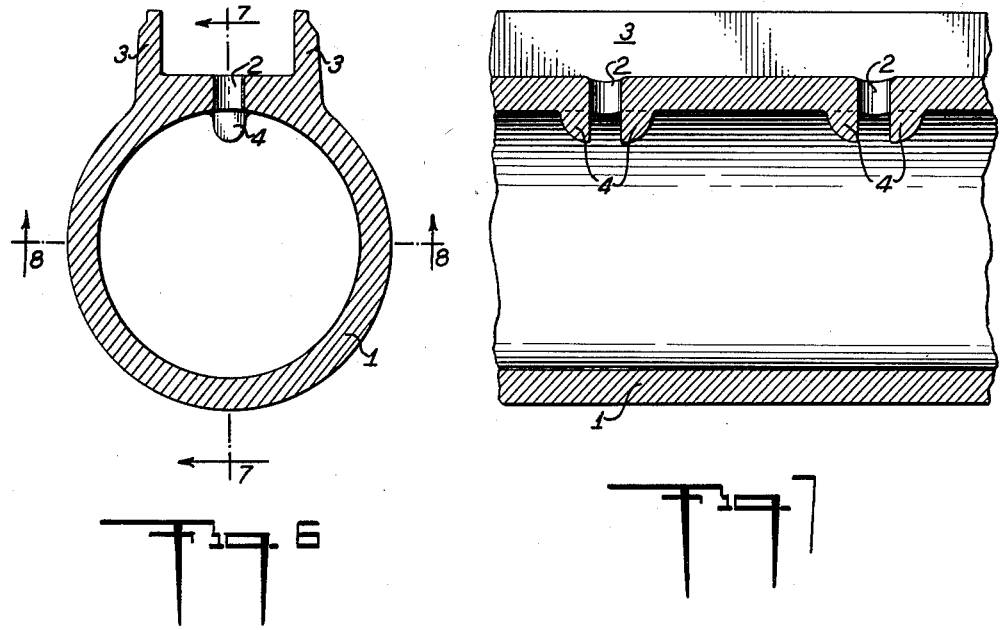
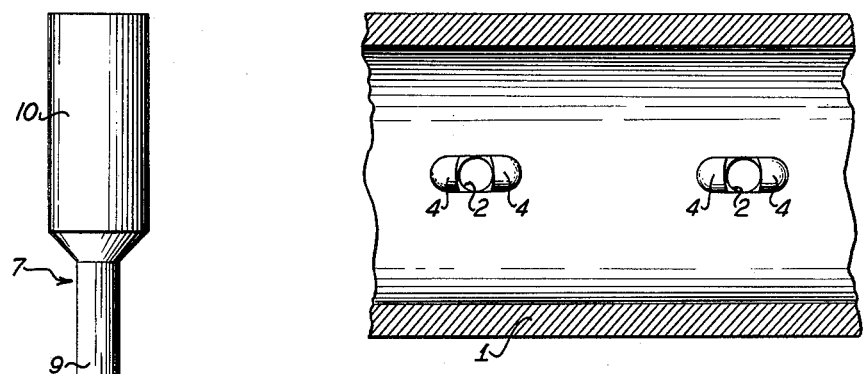
INVENTOR
ARTHUR P. SHEPARD
BY *Burgess · Dinklage*
ATTORNEYS United States Patent Office 2,714,244
Patented Aug. 2, 1955

2,714,244
METHOD FOR THE PRODUCTION OF SPRAY TUBE ORIFICES FOR IRRIGATING DEVICES

Arthur P. Shepard, New York, N. Y., assignor to Metallizing Engineering Co. Inc., Long Island City, N. Y., a corporation of New Jersey Original application October 11, 1951, Serial No. 250,864. Divided and this application November 14, 1952, Serial No. 320,573

4 Claims. (Cl. 29—157)

This invention relates to new and useful improvements in the method for the production of spray tube orifices for irrigating devices, and is a division of my co-pending application, Serial No. 250,864 filed October 11, 1951.

Sprinklers for use for watering lawns and the like frequently include a tube through which irrigating water passes and a number of nozzles or orifices located longitudinally along the tube, the orifices being fed with water from the tube. The tube forms a manifold for supplying water to a row of individual spray orifices.

There are a number of types of irrigating devices which include tubes with orifices as described above. Some of these consist merely of long, stationary tubes which are set by hand in the desired position. Others known as oscillating sprinklers provide motors for regularly oscillating spray tubes about an axis so that the water emerging from the nozzles forms roving streams or jets. In oscillating sprinklers it is common practice to set some of the nozzles at different angles to the axis of oscillation so that the water emerging from the nozzles diverges with the shape of a flat fan. This fan-like spray pattern is usually obtained by the use of a spray tube bent into the shape of an arc, with the nozzles or orifices set normal to the arc of the spray tube at each point along its length.

In all cases, however, including either the oscillating type sprinklers or the hand-settable tube type of sprinklers, it is necessary for efficient results to obtain clearly defined separate jets of water from each nozzle or orifice. Such clear streams of water project the farthest and deliver the most water to the ground area toward which they are directed and lose the least amount of water by evaporation. Water jets which form a broken spray or fog are to be avoided for this type of use since the primary function of irrigating devices is to spray large areas with the least possible loss of water.

In the past it has only been possible to obtain clean jets of water by constructing individual water nozzles and inserting them into the spray tube. Although individual nozzles of this type have been constructed satisfactorily, they are relatively expensive, particularly in their aggregate, since a large number of such nozzles are usually required.

Many attempts have been made to drill or punch orifices directly into the walls of the spray tubes in an effort to obtain nozzles for spray tubes of this type which are less expensive than individual inserted nozzles. All such attempts have been unsuccessful, in that they have failed to produce clean, non-fogging jets of water. One of the difficulties encountered when holes are drilled or punched directly into the spray tube is due to the fact that the shape and character of the jets of water emerging from such holes are materially affected by velocity and pressure of the water in the spray tube. It might be possible, for instance, to obtain reasonably clear jets from punched holes in a spray tube where the velocity of water is relatively low and where the water pressure is also relatively low, such as pressures of between 5 and 20 lbs. per square inch gauge. Higher water pressures, however, cause trouble with spray tubes made in this manner.

It is one object of this invention to provide a method for making orifices for spray tubes, which overcomes the foregoing objections and which provides spray tubes capable of delivering clean, separate water jets which are not affected materially by changes in velocity or pressure within the spray tubes. It is a further object of this invention to provide a method for producing such orifices at a very low cost. These and other objects of this invention will become apparent from the following description read in conjunction with the drawings in which:

Fig. 1 is a top elevation of one embodiment of a spray tube with orifices made in accordance with the invention;

Fig. 2 shows a side view of the spray tube shown in Fig. 1 viewed at a right angle thereto;

Fig. 3 represents an end view of the spray tube shown in Fig. 2;

Fig. 4 illustrates a perspective end view of an alternative embodiment of spray tube made in accordance with the invention;

Fig. 5 is a side view, partially in cross-section, of the spray tube shown in Fig. 4;

Fig. 6 shows an enlarged cross-sectional view of the spray tube shown in Fig. 1, in the plane VI—VI thereof;

Fig. 7 is a cross-sectional view of part of the structure of Fig. 6 in the plane VII—VII thereof;

Fig. 8 is a cross-sectional view of part of the structure of Fig. 6 in the plane VIII—VIII thereof;

Fig. 9 represents a side view of a tool usable in the making of orificed tubes in accordance with the invention; and Fig. 10 illustrates an end view of the tool shown in Fig. 9 in the direction of the chisel point.

Referring to Figs. 1, 2, 3, 6, 7 and 8, spray tube 1 is a manifold for conducting water under pressure to spray jet orifices 2. Raised ridges 3 extend on both sides of orifices 2. Orifices 2 extend through the wall of spray tube 1 and are approximately flush with both the outer and inner surfaces of said spray tube wall.

Projections 4 project as an integral part of the spray tube 1 from the inner surface of the spray tube wall toward the center of said spray tube and are located immediately adjacent the inner termini of orifices 2. There are two projections for each orifice. Each pair of projections is located on opposite sides of an orifice on a line approximately parallel to the axis of spray tube 1, and passing through the center of the orifice. While as shown the orifices are all centered on a straight line parallel to the axis of the spray tube and extend into the spray tube normal to the axis thereof, they may, in accordance with my invention, be positioned in any desired alignment or manner in order to obtain any desired spray pattern.

While I prefer to locate the projections 4 for each orifice on a line parallel to the spray tube axis and passing through the center of that particular orifice, the same is not necessary. It is only necessary that a substantial portion of a projection be in front of each orifice in a direction approximately parallel to the flow direction of water through the spray tube. Thus, I have found that even with projections centered on a line extending from the center of the orifice at an angle of about 45° to the spray tube axis or direction of water flow through the tube, satisfactory results are obtained. This positioning of the projection with a substantial portion thereof in front of the orifice in the direction of water flow through the tube, will be referred to herein and in the claims as an axial positioning of the projection in relation to the orifice. With projections on each side of the orifice enabling the water flow to be effected in either direction through the tube with the full benefits of the invention, the projections are said to be positioned on each axial side of the orifice.

The distance which the projections 4 project into the interior of the spray tube, i. e., their depth, is not critical other than that they must be of noticeable depth and not so heavy that they might have a blocking action of an extent interfering with the satisfactory performance of the spray tube. Within the preferred construction of my invention, it is best to have them project into the tube a distance of from ¼ to 4 times the diameter of the orifice. The width of said projections should preferably be equal to the diameter of orifice 2. If desired, the projections may be much wider than the diameter of their orifice but they should not be appreciably narrower than about ½ said diameter. The length of the projections in a direction toward their respective adjacent orifices is not critical. However it is only necessary that they be long enough to have sufficient strength.

It is not necessary, though for best results desirable, to have the surface portion of projections 4 adjacent orifice 2 curved somewhat corresponding to the curved edge of orifice 2. If projections 4 are provided with a curved surface adjacent orifice 2, it is most preferable for the curved surface of said projections 4 to have a curvature which is somewhat less than the curvature of the adjacent orifice surface.

In operation, irrigating water is fed under pressure into spray tube 1 from whence it flows out through orifices 2, forming a multiple number of smooth spray streams or jets. Since there are a multiple number of orifices 2, the water flows through spray tube 1 and passes at least some of orifices 2 with a velocity of flow. Water passing lengthwise of the spray tube and across the entrance of any orifice 2 is deflected in its flow by the upstream projection adjacent said orifice so that the maximum velocity of said flow does not occur at the inner terminus of said orifice. Water may, however, enter orifice 2 at its inner terminus from the sides between opposing projections, as well as directly from any portion of the tube beyond said projections.

The structure as above described and made in accordance with this invention provides a spray tube with orifices therein which will deliver clean, smooth streams of water from said orifices throughout a wide range of pressure, and velocity conditions within said spray tube. Though opposing projections are preferred, good results may be obtained by using only a projection at the up-stream side of the orifice relative to the direction of liquid flow for which the tube is intended or designed.

Wherever spray tubes have been constructed, in the past, with drilled or punched orifices, the spray jets issuing therefrom have been affected by velocity of flow within the spray tube and often produced foggy or broken up streams. The effect of the projection up-stream of the orifice in accordance with the invention would seem to perform the function of deflecting water traveling past the orifice, and thus change the flow characteristics, favorably affecting the performance of the orifice. The effect of the projections downstream from the orifice is to still further improve performance of the spray tube and orifice combination, and also help to streamline the flow around the orifice entrance.

The use of opposing projections for an orifice on a line parallel to the axis of the spray tube has the advantage of providing a spray tube which may be used with water flowing in either direction. This is a real advantage since it permits further manufacturing steps and/or assembly after manufacture of the spray tube without regard to a particular end that must be connected up to the water inlet.

Referring to Figs. 4 and 5, the spray tube 5 has been bent so that orifices 6 therein are located on a line along the arc of a circle. Water jets emerging from said orifice will hence form in a pattern of a flat fan. This is particularly desirable for spray tubes of this type for use with oscillating type irrigating sprinklers.

A further advantage of spray tube orifice combinations constructed in accordance with my said co-pending application resides in the discovery that spray tubes can be made smaller in diameter and hence less expensively when my novel construction is used. This is due to the fact that higher velocities across the jet entrances do not affect the performance of jets with projections made in accordance with this invention, thus permitting the use of higher velocity, smaller diameter tubes.

Raised ridges 3 shown in Figs. 1, 2, 3, 6, and 7 are sometimes used to protect the jets from the effects of a crosswind, but they are not necessary to the operation of the device in accordance with this invention.

The novel spray tube orifice constructions could be made in a number of different ways. It would, for instance, be possible to produce this construction by drilling holes in a tube and by welding or brazing the necessary projections in place adjacent the orifices in the inner side of the spray tube. Such methods of manufacture are however very expensive. In accordance with the method of this invention, spray tube orifice constructions, as described above, may be produced very inexpensively.

In accordance with my novel method a punch 7, as shown in Figs. 9 and 10, is used. This punch consists of the active punching section 8 and the shank sections 9 and 10. The active section of the punch 8 may be made by forming a cylindrical section equal in diameter to the diameter of the desired jet orifice. The end of the punch is then sharpened to a chisel-like point by grinding two flat intersecting surfaces which intersect on the center axis of said cylindrical section. The included angle of the chisel point punch may be between 15 and 60 degrees, but most preferably between 30 and 40 degrees.

In carrying out this method I provide a spray tube of a ductile material. I have found aluminum and aluminum alloys particularly suitable for this purpose. The wall thickness of the tube at the portions to be orificed should be preferably from ¼ to 4 times the diameter of the intended orifices. In use the punch is located over the spray tube. The edge of the chisel point is set, for example, at right angles to the spray tube axis. The punch is then pressed into the spray tube. This first cutting action is to produce a slot normal to the spray tube axis. As it is pressed further into and through the wall of the spray tube, the cylindrical section of the punch forms a cylindrical hole in said spray tube wall and also forces the previously slotted metal apart to form projections on the inner surface of the spray tube adjacent to the orifice. The orifices and projections formed in the spray tube by this method are in accordance with the structure of the previously described spray tube and orifice combination.

While in the description of the above method mention was made of the chisel edge of the punch being located about normal to the axis of the spray tube, the same is not necessary. The projections will be formed on either side of the chisel edge, which edge should accordingly be so positioned that the projections formed will be on each axial side of the orifice. Though in the type of tube shown the punching should preferably be effected with the chisel edge at an angle of about 90° with the axis of the tube, I have found that satisfactory orifice structure can be made with the chisel edge set at an angle anywhere from about 45–90° to the spray tube axis.

One of the most important uses of spray tubes made in accordance with this invention is in conjunction with oscillating type irrigating sprinklers. For sprinklers of this type it is desirable to have the spray tube bent into an arc (as illustrated in Fig. 5) so as to form a fan of water streams. In the past the manufacture of bent spray tubes of this type has been very expensive. The reason for this is that after bending, the axes of the orifices are not parallel, but radiate from a point so that it has not been possible to gang-punch or gang-drill these holes. It was, therefore, necessary in past practice to drill or punch these holes one at a time at great expense. Attempts have been previously made to gang-drill or gang-punch a number of orifices into a straight spray tube and to thereafter bend the spray tube to the desired arc. All such attempts have been failures due to the fact that the bending operation distorts and warps the holes, usually to a somewhat elliptical shape. Such shape orifices, in the past, have not performed satisfactorily since they produce very irregular and foggy streams. It is one of the outstanding advantages of this invention that orifices produced in accordance with this invention, with the internal projections described previously, can be produced with round holes in a straight spray tube and that the spray tube can thereafter be bent into the shape of an arc. Even after bending the spray tube, orifices with projections made in accordance with this invention, produce clean sharp streams of water and do not produce irregular foggy streams as in the past, even though the bending operation does cause distortion of the orifices into a somewhat elliptical shape.

Bent spray tube orifice combinations can thus be produced by a method in accordance with this invention, which comprises providing a multiple number of chisel-edged cylindrical punches, as shown in Fig. 9, mounted in a straight row with parallel axes and with chisel points set at least 45 degrees from the common axis of said punches; providing a tube of ductile material; punching a row of holes into said tube parallel to its axis; and thereafter bending at least the punched portion of said tube into shape of an arc with said holes appearing on the outer periphery of the arc.

I claim:

1. Method of producing in stock of ductile material at least one nozzle orifice of substantially predetermined diameter and having oppositely paired projections adjacent thereto, which comprises punch-cutting a slot with a wedge-shaped chisel into and through said stock, at an angle of slot direction to the tube axis of about 45–90°, of a length about approximating said diameter and thereafter punch-expanding said slot into substantially cylindrical shape corresponding to said diameter.

2. Method of producing irrigating tubes of ductile material having multiple nozzle orifices of predetermined diameter with oppositely paired projections adjacent thereto which comprises punch-cutting a row of slots with a wedge-shaped chisel into and through the wall of such tube substantially parallel to its tube axis and at an angle of slot direction for each slot to tube axis of about 45–90° and a length of each slot about approximating said diameter, and thereafter punch-expanding said slots into substantially cylindrically-shaped orifices, each corresponding to said diameter, thereby forcing the previously slotted metal apart to form for each said orifice at the inner tube surface opposing pairs of projections adjacent their orifice.

3. Method according to claim 1 in which said wedge-shaped chisel has an included angle defining the chisel point of from 15–60°.

4. Method according to claim 2 in which said wedge-shaped chisel has an included angle defining the chisel point of from 15–60°.

References Cited in the file of this patent

UNITED STATES PATENTS

| Number | Name | Date |
|---|---|---|
| 886,036 | Brown | Apr. 28, 1908 |
| 1,246,456 | Parpert | Nov. 13, 1917 |
| 1,250,411 | Amiot | Dec. 18, 1917 |
| 1,264,854 | Possons | Apr. 30, 1918 |
| 2,124,406 | Spatta | July 19, 1938 |
| 2,292,799 | Romann | Aug. 11, 1942 |
| 2,318,769 | Freeman | May 11, 1943 |
| 2,383,584 | Beishline | Aug. 28, 1945 |
| 2,632,511 | Hamilton | Mar. 24, 1953 |